United States Patent [19]

Yamada

[11] 4,197,763
[45] Apr. 15, 1980

[54] SYNCHRONIZING DEVICE FOR WIRE-ACTIVATED MECHANISMS

[75] Inventor: Seiichiro Yamada, Hamamatsu, Japan

[73] Assignee: Yamaha Hatsudoki Kabushiki Kaisha, Iwata, Japan

[21] Appl. No.: 919,411

[22] Filed: Jun. 26, 1978

[30] Foreign Application Priority Data

Jul. 8, 1977 [JP] Japan .............. 52-90745[U]

[51] Int. Cl.² .............................................. F16C 1/22
[52] U.S. Cl. ............................. 74/501.5 R; 74/489
[58] Field of Search .............. 74/501 R, 501.5 R, 480, 74/489

[56] References Cited

U.S. PATENT DOCUMENTS

| 2,298,611 | 10/1942 | Bruderlin | 74/501.5 R |
| 2,363,229 | 11/1944 | Cade | 74/501.5 R |

FOREIGN PATENT DOCUMENTS

| 217113 | 1/1942 | Switzerland | 74/501 |
| 750478 | 6/1956 | United Kingdom | 74/489 |

*Primary Examiner*—Kenneth Dorner
*Attorney, Agent, or Firm*—Donald D. Mon

[57] ABSTRACT

Apparatus for synchronizing the operation of a pair of wire-operated mechanisms such as a carburetor and a lubricating oil pump. In order to take up block or looseness which may exist, the actuated wires from the mechanisms are connected to a rocker beam which is part of a slider. An actuating wire is connected to the slider. Lock means is unlocked and enables the rocker beam to equalize tension in the two wires until a sufficient force is exerted by the actuating wire, whereupon the lock means locks the beam and the adjusted actuating wires operate the mechanisms in synchronism.

17 Claims, 6 Drawing Figures

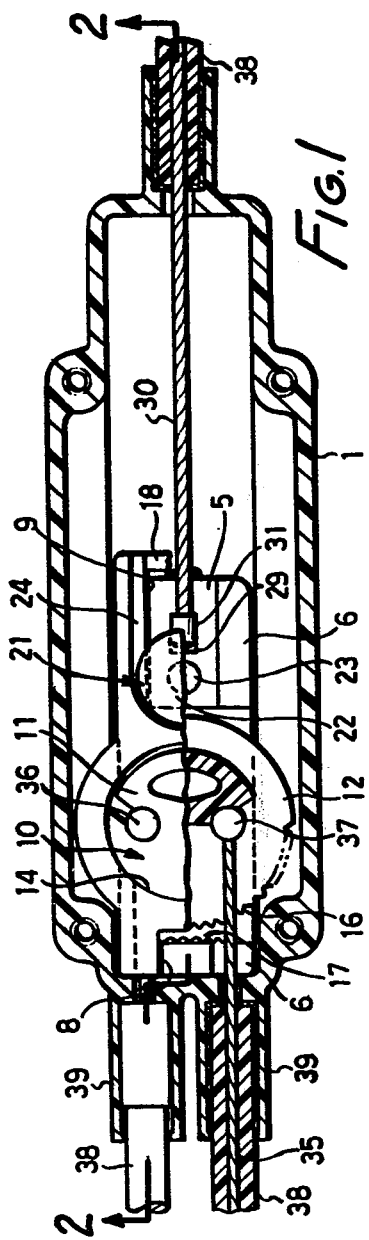
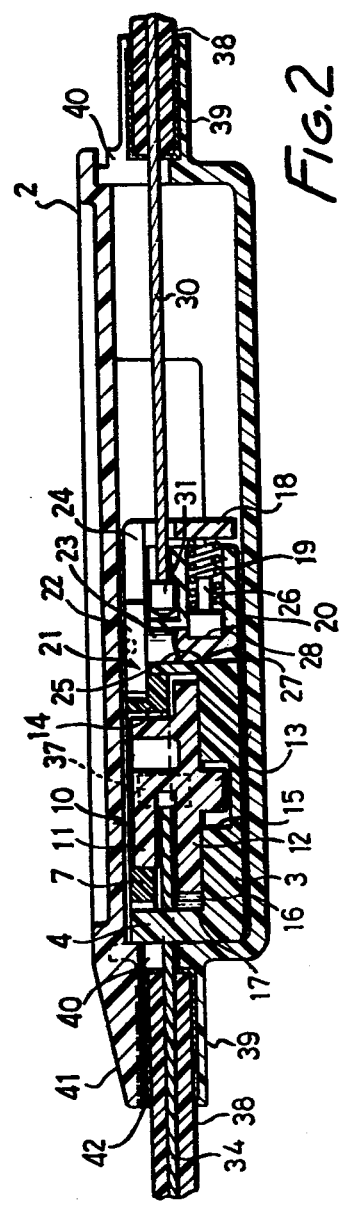

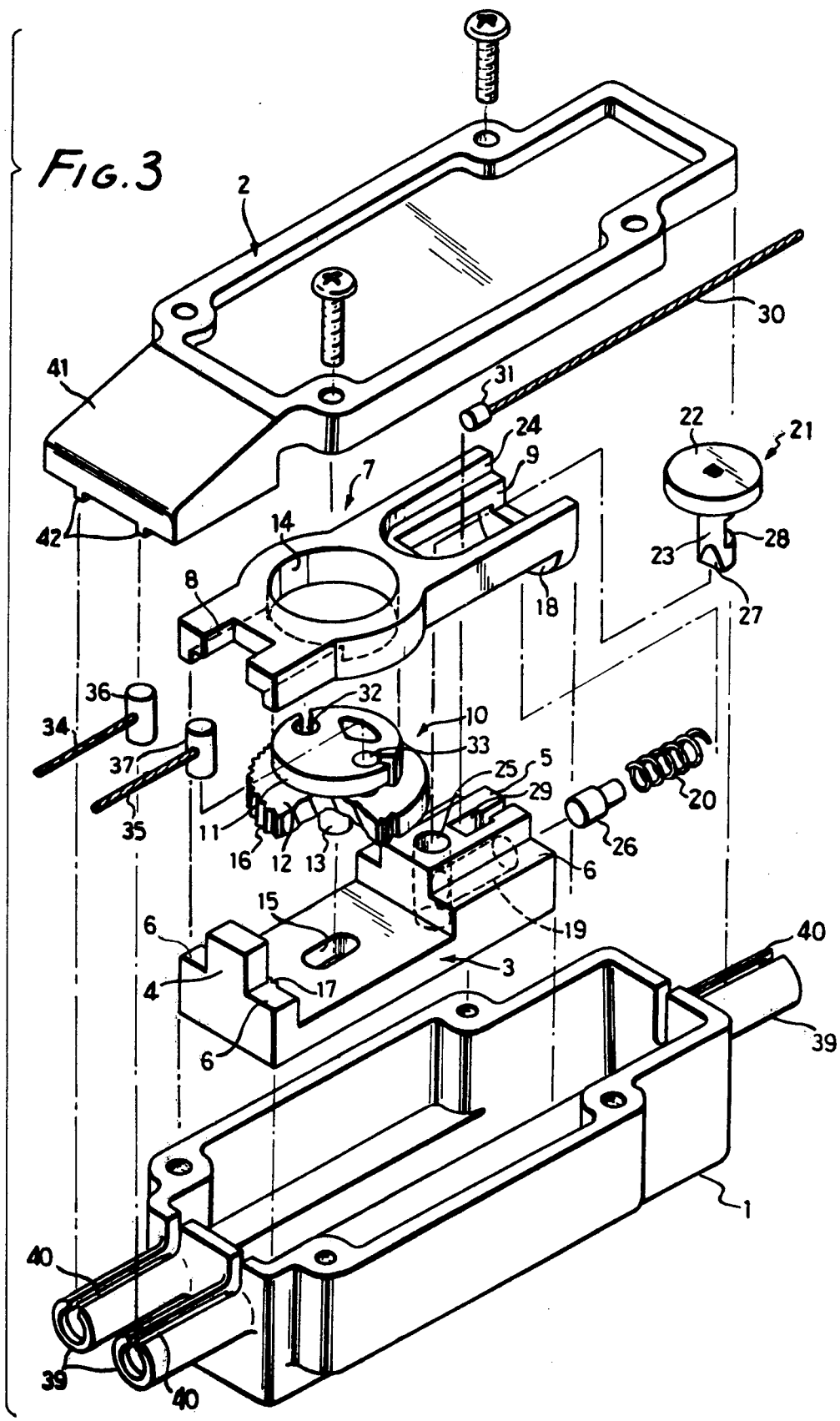

SYNCHRONIZING DEVICE FOR WIRE-ACTIVATED MECHANISMS

The present invention relates to synchronizing apparatus wherein a pair of wire-actuated mechanisms are simultaneously actuated by a single actuating wire.

In known motorcycles utilizing, for example, two stroke cycle engines, two Bowden-type actuated wires are connected at their first ends to an actuating Bowden-type wire, which in turn is operatively connected to the throttle grip of the motor cycle. The actuated Bowden wires are respectively connected at their other ends to a throttle valve of a carburetor, and to a pulley for controlling the plunger stroke of a lubricating oil pump, respectively, so that the throttle-valve opening and the pump plunger stroke may be controlled in synchronization with each other.

In such an arrangement of wires, however, certain amounts of play are involved in the movement of the actuated Bowden wires, due to looseness of connection and/or slack of the wires. The amounts of play of both of said actuated Bowden wires are not always equal to each other. Consequently, if the slack or play are not suitably compensated or adjusted after the assembling of the Bowden wires, such a disorder of synchronization may occur that the throttle valve remains closed because the play of the Bowden wire for the throttle valve is not completely taken up, whereas the play of the bowden wire for the lubricating oil pump has been taken up and this wire brings the plunger-stroke adjusting pulley into action, resulting in an excessive supply or shortage of the lubricating oil.

For this reason, conventionally the adjustment of the Bowden wires must be made taking the difference of amounts of play of the two Bowden wires into account. this is highly complicated and troublesome.

At the same time, even if the adjustment of the Bowden wires has been made correctly at the time of the forwarding or shipping of the motor cycles, the amount of play of the actuating Bowden wires will in time differ from each other, due to different amounts of wear of the connecting portions and different amounts of elongation of wires caused in the long use, resulting in a deterioration of the synchronized operation of the associated mechanisms.

It is therefore an object of the invention to overcome the above described problem of the prior art by providing an improved synchronizing device which adjusts and ensures correct synchronous operation, despite elongation of wires which may take place as a result of long use.

Apparatus according to this invention includes a slider in a case. The actuating wire is connected to the slider, and the actuated wires are connected to a rocking beam which forms part of the slider. Lock means releases the rocking beam to rock and equalize tension in the two actuating wires until a sufficient tension is applied by the actuator wire. Then the lock means locks and the adjusted actuating wires move in synchronism.

According to a preferred but optional feature of this invention, the beam includes an arcutate structure which bears inter-engaging surfaces adapted to be engaged by other such surfaces for locking purposes.

The above and other objects, as well as advantageous features of the invention will become clear from the following description of preferred embodiments taken in conjunction with the accompanying drawings.

FIG. 1 is a top view of the presently-preferred embodiment of the invention, with portions removed, cutaway, and shown in cross-section.

FIG. 2 is a cross-section taken at line 2—2 in FIG. 1;

FIG. 3 is an exploded view in oblique view, of the device of FIG. 1;

Figure 4:
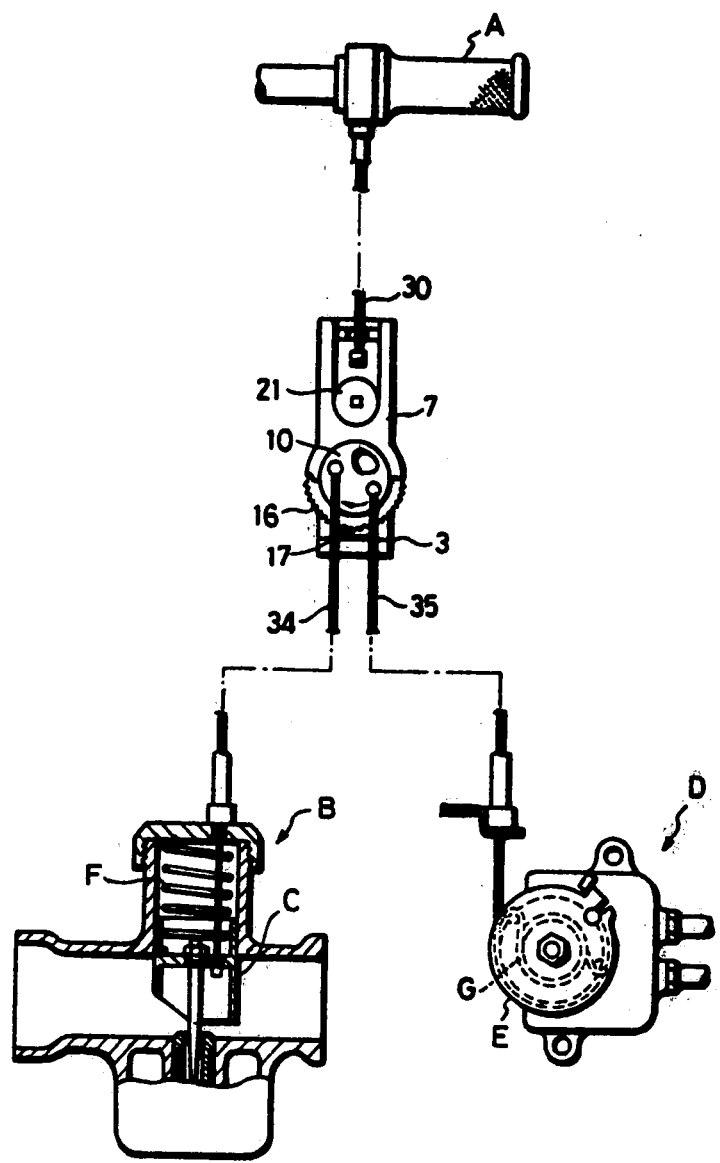
FIG. 4 shows the device of FIG. 1 in a linkage system in one condition wherein the locking means is released.
Figure 5:
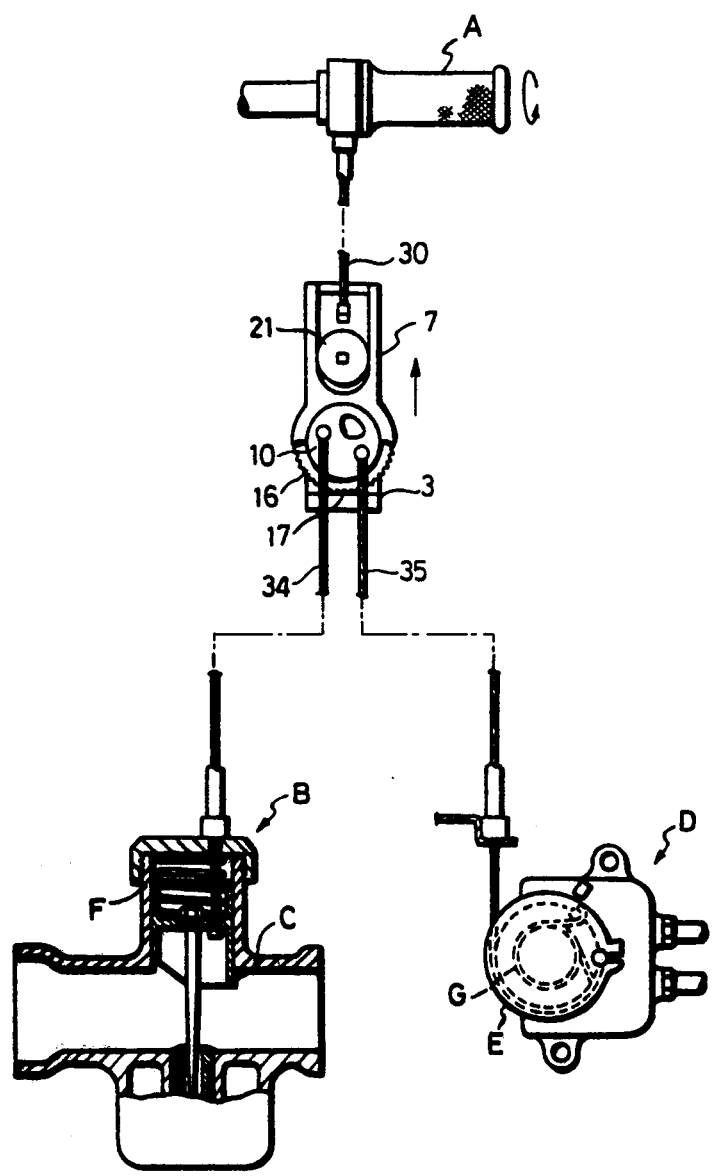
FIG. 5 is similar to FIG. 4, wherein the locking means is locked.
Figure 6:
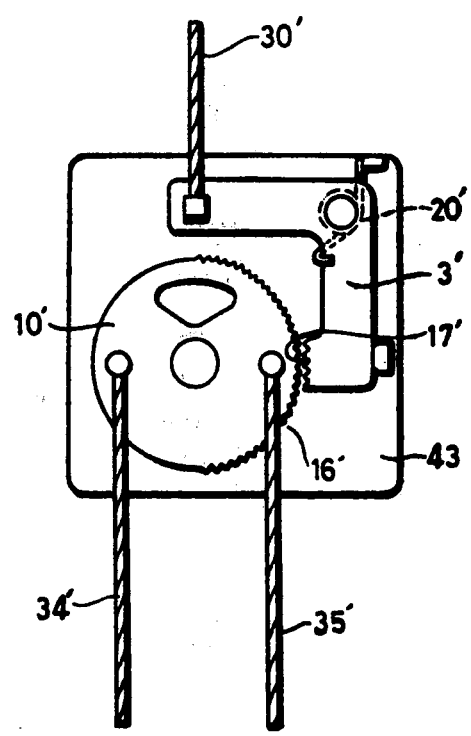
FIG. 6 is a plan view of another embodiment of the invention.

Referring first to FIGS. 1 to 5 showing a first embodiment of the invention, the device of the invention has a case 1 with a closure member 2. The case 1 axially slidably receives a slider 3, having a slider body 3a both ends of which have guiding projections 4,5 formed unitarily therewith. The shoulder portions of each guiding projection 4, 5 constitute guiding steps 6. A rocker beam 7 is provided at both of its ends with guiding notches or recesses 8,9 adapted to slidably engage the guiding steps 6 of guiding projections 4, 5. Guide 7 is thereby guided for free sliding movement.

A rocker beam generally designated at numeral 10 has an upper rotary flange 11 and a lower retaining flange 12 of a larger diameter than the upper rotary flange 11. A shaft 13 or post projects from the center of the lower surface of the retaining flange 12 unitarily with the latter. The above mentioned rotary flange 11 is rotatably received in a hole 14 formed almost at the center of guide 7, while shaft 13 is slidably and rotatably received in an elongated bore 15 formed almost at the center of the slider.

Retainer flange 12 is received in a gap formed between the guide 7 and the slider 3. Consequently, beam 10 is allowed to rotate around a center of rotation (the center of hole 14). Also, it slidingly moves along with the rotor guide 7 in the axial direction.

Locking teeth 16 (sometimes called "inter-engageable surface") are formed on the outer periphery of the retaining flange 12 of the beam 10, over almost half of the entire circumference of the same. Cooperating locking teeth 17 (also sometimes called "inter-engageable surfaces") are formed on a side surface of a guiding projection 4 on the slider so as to confront teeth 16. The arrangement is such that the retaining teeth 16, 17 are brought into and out of engagement with each other, as the beam 10 is slided relatively to the rest of the slider.

An abutting projection 18 )sometimes called a "skirt") is formed at one end of guide 7. It extends downwardly from the latter, so as to oppose one end surface of the guiding projection 5, with a suitable space left therebetween. Guiding projection 5 has a spring hole 19 which opens in one end surface thereof and accommodates a compression (bias) spring 20.

Spring 20 acts on the abutting projection 18, so as to bias guide 7 and the beam 10 rightward as viewed in FIGS. 1 and 3, i.e. in the direction of disengagement of the teeth 16 and 17.

A retainer 21 ("retainer means") having a head portion 22 of a diameter larger than the breadth of the guiding recess 9 of the red guide 7, and a leg portion 23, is adapted to hold the slider together. The head portion 22 is slidably received by a recess 24 formed in guide 7, while the leg portion 23 is received by a bore 25 formed in guiding projection 5. The aforementioned spring hole 19 opens at its other end in the inner surface of the bore 7. Apparatus according to claim 6 in which the second body part has a depending skirt, and the said bias means is carried by said first body part in axial alignment with said skirt to bias the body parts relative to one another.

8. Apparatus according to claim 7 in which said surfaces comprise teeth on an actuate surface carried by the rocking beam, and teeth on the first body.

9. Apparatus according to claim 8 in which said beam is incorporated into an element having a substantially circular bearing surface, and said second body includes a matching circular bearing surface.

10. Apparatus according to claim 1 in which the slider comprises a body to which the beam is rotatably mounted, and in which the locking means includes a lever pivotally mounted to the body having a first arm attachable to the actuating wire, and a second arm adapted to be drawn against the rockable beam to prevent its rotation, said bias means biasing the second arm away from the beam.

11. Apparatus according to claim 10 in which the lever is L-shaped.

12. Apparatus according to claim 10 in which the locking means includes inter-engageable surfaces on said second arm and on said beam.

13. Apparatus according to claim 12 in which said bias means is a clothespin-type spring.

14. Apparatus according to claim 13 in which the lever is L-Shaped.

15. Apparatus according to claim 1 in which said slider is enclosed in a case, which supports the slider for axial movement.

16. Apparatus according to claim 2 in which said slider is enclosed in a case, which supports the slider for axial movement.

17. Apparatus according to claim 3 in which said slider is enclosed in a case, which supports the slider for axial movement.

* * * * *

United States Patent [19]

Auernhammer

[11] 4,197,764
[45] Apr. 15, 1980

[54] DETACHABLE HANDLE ASSEMBLY

[76] Inventor: Marcus J. Auernhammer, 11295 Engleside, Detroit, Mich. 48205

[21] Appl. No.: 964,964

[22] Filed: Nov. 30, 1978

Related U.S. Application Data

[63] Continuation of Ser. No. 786,656, Apr. 11, 1977, abandoned.

[51] Int. Cl.² .......................... G05G 1/00; B25G 3/00
[52] U.S. Cl. ........................................ 74/544; 30/340; 403/390
[58] Field of Search ............... 74/480 B, 544, 551.1; 30/340, 341, 342, 344; 24/81 CR; 403/390, 399, 400

[56] References Cited

U.S. PATENT DOCUMENTS

| | | | |
|---|---|---|---|
| 1,262,425 | 4/1918 | Young | 74/544 |
| 1,450,113 | 3/1923 | Pratt | 74/544 |
| 2,602,953 | 7/1952 | Dalglish et al. | 74/551.1 |
| 2,697,457 | 12/1954 | Lawrence | 30/340 |
| 2,716,281 | 8/1955 | Wallace | 30/344 |
| 3,274,849 | 9/1966 | Hanson | 74/544 |
| 3,371,641 | 3/1968 | Rohman et al. | 74/480 B |
| 3,456,525 | 7/1969 | Oldham | 74/480 B |
| 3,503,276 | 3/1970 | Vigot | 74/544 |
| 3,949,817 | 4/1976 | Rice | 74/544 |
| 4,032,246 | 6/1977 | Waara | 403/390 |

FOREIGN PATENT DOCUMENTS 918043 1/1947 France .................................... 74/544

Primary Examiner—Kenneth Dorner
Attorney, Agent, or Firm—Gifford, Chandler, VanOphem, Sheridan & Sprinkle

[57] ABSTRACT

A detachable handle assembly is provided for a powered garden tool, such as a hedge trimmer. The handle assembly according to the present invention includes an elongated first member having a hand grip formed at one axial end. A clamp assembly is connected to the other axial end of the elongated member and detachably, clampingly receives the garden tool so that the garden tool can be moved by means of the elongated handle member. In addition, the clamp assembly is adjustably coupled to both the garden tool and the elongated handle member such that both the angle and pitch of the garden tool relative to the elongated handle member can be infinitely variably adjusted.

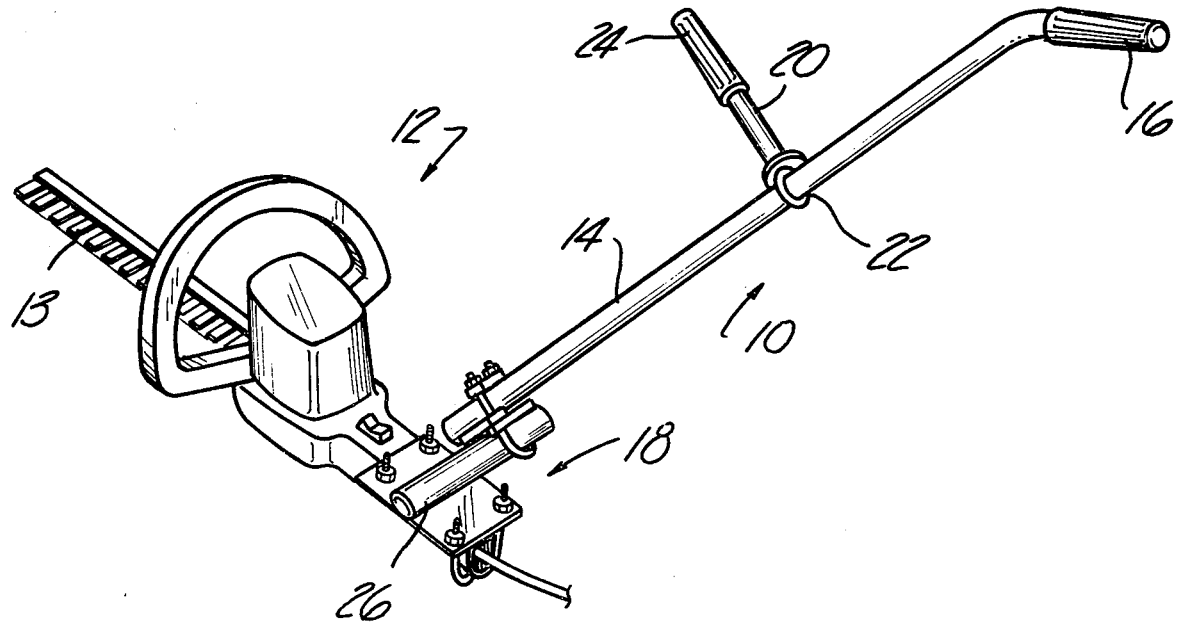

4 Claims, 4 Drawing Figures